United States Patent Office 3,420,846
Patented Jan. 7, 1969

3,420,846
7-SUBSTITUTED MITOMYCIN A
Masanao Matsui, Tokyo, Keizo Uzu, Shizuoka-ken, and Yasuhiro Yamada and Shigetoshi Wakaki, Tokyo, Japan, assignors to Kyowa Hakko Kogyo Co., Ltd., Tokyo, Japan, a corporation of Japan
Filed July 19, 1965, Ser. No. 472,813
Claims priority, application Japan, Aug. 25, 1964, 39/47,830
U.S. Cl. 260—326.3     2 Claims
Int. Cl. C07d 27/54

---

ABSTRACT OF THE DISCLOSURE

Compounds having the formula:

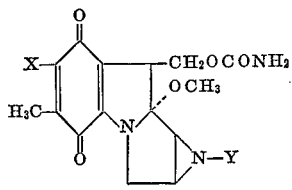

Figure 1:
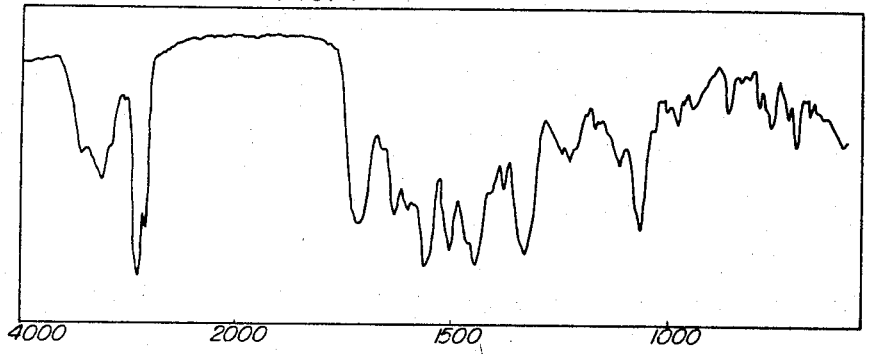

wherein X is selected from the group consisting of N-lysino, N-arginino and $NHR_1$, $R_1$ being any alkyl group having from 3 to 6 carbon atoms or a phenyl group and Y is selected from the group consisting of H, methyl and benzoyl.

---

The present invention relates to new antibiotics, more particularly to new derivatives of mitosane compounds.

In 1956, Hata et al. isolated new antibiotics from the fermented broth of *Streptomyces caespitosus* and named the antibiotics mitomycin A and B. In 1958, Wakaki et al. isolated a third antibiotic from the same broth and named it mitomycin C. Since then it has been determined that the chemical composition of the three compounds is as follows:

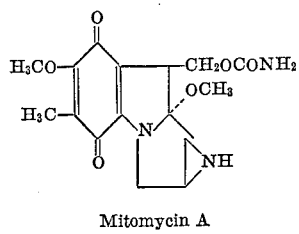
Mitomycin A

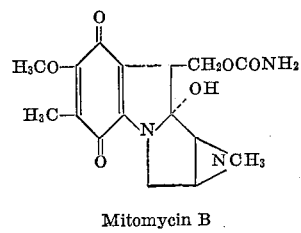
Mitomycin B

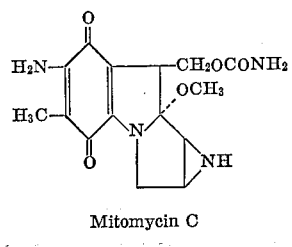
Mitomycin C

Generally, these compounds correspond to the formula

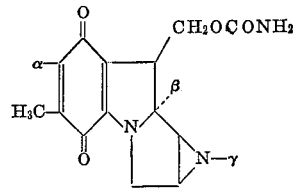

wherein

| | A | B | C |
|---|---|---|---|
| α is | $OCH_3$ | $OCH_3$ | $NH_2$ |
| β is | $OCH_3$ | OH | $OCH_3$ |
| γ is | H | $CH_3$ | H |

These compounds thus have the following skeleton:

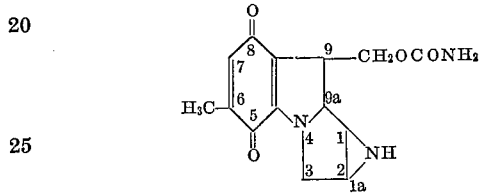

and are called mitosane compounds.

Mitomycin A, B and C are excellent antibiotics, but they have a defect in that they are toxic to human blood. In order to obtain less toxic mitosane compounds, some research has been conducted even before the determination of the chemical composition of mitomycin A, B and C; for example, monomethyl-mitomycin C or porifiromycin was synthesized by reacting mitomycin C and methyl iodide in the presence of potassium carbonate. After the determination of the chemical composition of mitomycin A, B and C, research to obtain derivatives has been actively conducted. For example, Belgian Patent 624,559 provides some 6,7 and 1a-substituted derivatives of mitosane compounds.

The present invention is concerned with novel mitosane derivatives of reduced toxicity and of correspondingly enhanced utility as antibiotics, and to the preparation thereof.

The new antibiotics of the present invention are:

7-anilino-9a-methoxymitosane
7-n-butylamino-9a-methoxymitosane
7-n-amylamino-9a-methoxymitosane
7-n-hexylamino-9a-methoxymitosane
7-N-lysino-9a-methoxymitosane
7-N-arginino-9a-methoxymitosane
1a-methyl-7-(n-propyl)amino-9a-methoxymitosane, and
1a-benzoyl-7-(n-propyl)amino-9a-methoxymitosane.

According to the present aspect, mitomycin A or a 1a-substituted derivative thereof is reacted with appropriate amino group-containing compound, such as primary amine, secondary amine, amino acid, etc., and the methoxy group at the 7-position of the starting compound is replaced by amino or substituted amino (cf. first aspect supra).

The reaction is carried out by dissolving the starting compound in an appropriate solvent, such as methanol, and adding an excess of the reactant amino compound. The reddish purple color of the starting solution is changed to bluish purple, and this is accompanied by a corresponding change in the ultra-violet absorption spectra.

The following examples set forth illustrative, but not limitative, presently preferred embodiments of this aspect.

Example 1

7-anilino-9a-methoxymitosane 500 mg. (milligrams) of mitomycin A is dissolved in 20 ml. (milliliters) of methanol, followed by the addition of 2 ml. of aniline. The reaction mixture is allowed to stand for 2 hours at room temperature. The thus-obtained green solution is concentrated under reduced pressure, and the obtained greenish paste is dissolved in ethyl acetate and passed through a silica-gel column. Development and elution are conducted by using the mixture of acetone and ethyl acetate (1:3). The eluate is concentrated under reduced pressure and then petroleum ether is added, as precipitant for the objective 7-anilino-9a-methoxymitosane. Yield: 430 mg.

*Analysis.*—Calcd. for $C_{21}H_{22}O_5N_4$: C, 61.45; H, 5.40; N, 13.65. Found: C, 61.20; H, 5.10; N, 13.26.

The infra-red spectrum in Nujol is shown in FIG. 1.

Example 2

7-n-butylamino-9a-methoxymitosane 500 mg. of mitomycin A is dissolved in 5 ml. of methanol, and then an excess of n-butylamine is added. After standing for 10 minutes, the color of the reaction mixture changes to bluish purple from reddish purple. The mixture is concentrated in vacuo and the resulting residue is dissolved in ethyl acetate, the resulting solution being then passed through silica-gel column. Ethyl acetate is used for developing and eluting. The eluate is concentrated in vacuo, ether being added as precipitant for the objective 7-n-butylamino-9a-methoxymitosane. Yield: 410 mg.

*Analysis.*—Calcd. for $C_{19}H_{26}O_5N_4$: C, 58.45; H, 6.71; N, 14.35. Found: C, 58.20; H, 6.20; N, 14.05.

Figure 2:
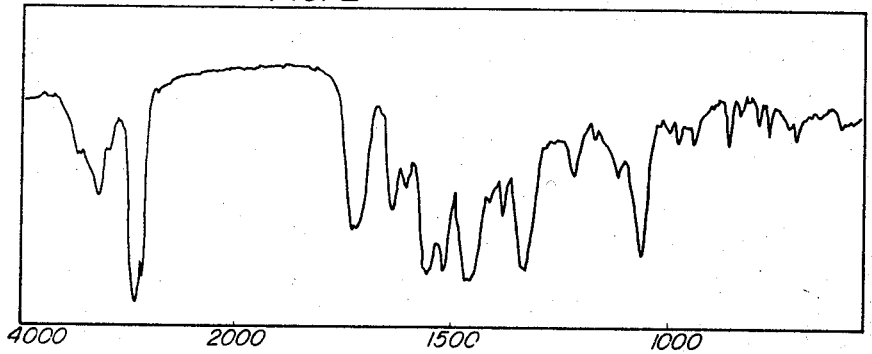

The infra-red spectrum in Nujol is shown in FIG. 2.

Example 3

7-amylamino-9a-methoxymitosane

Using n-amylamine in place of n-butylamine in Example 2b, 480 mg. of 7-n-amylamino-9a-methoxymitosane is produced from 500 mg. of mitomycin A.

*Analysis.*—Calcd. for $C_{20}H_{28}O_5N_4$: C, 59.39; H, 6.98; N, 13.85. Found: C, 59.10; H, 6.58; N, 13.50.

Figure 3:
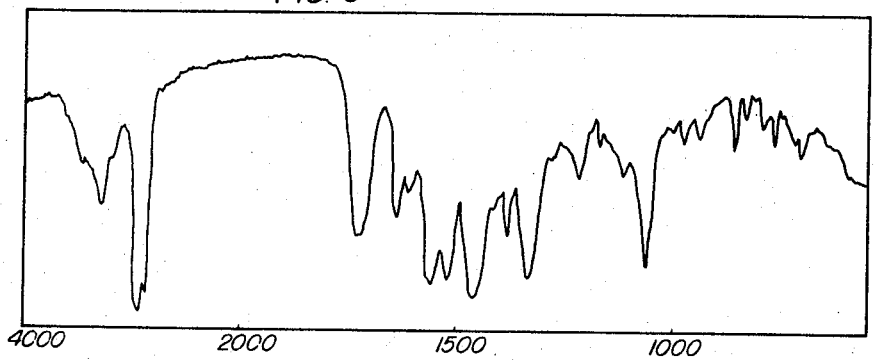

The infra-red spectrum in Nujol is shown in FIG. 3.

Example 4

7-n-hexylamino-9a-methoxymitosane

Using n-hexylamine in place of n-butylamine in Example 2, 490 mg. of 7-hexylamino-9a-methoxymitosane is produced from 500 mg. of mitomycin A.

*Analysis.*—Calcd. for $C_{21}H_{30}O_5N_4$: C, 60.27; H, 7.23; N, 13.39. Found: C, 60.01; H, 7.10; N, 13.08.

Figure 4:
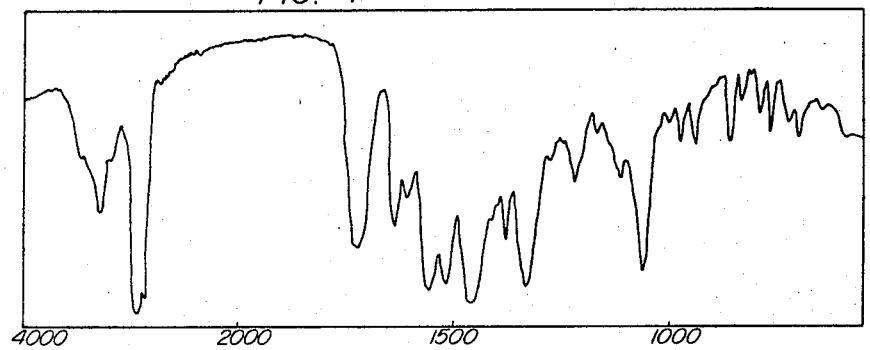

The infra-red spectrum in Nujol is shown in FIG. 4.

Example 5

7-N-lysino-9a-methoxymitosane 350 mg. of mitomycin A is dissolved in 40 ml. of water, followed by the addition of 150 mg. of L-lysine. After standing for 1 hour, the color of the reaction mixture changes to bluish purple. The reaction mixture is concentrated in vacuo and the resulting residue is dissolved in methanol, followed by the addition of ether as precipitant. The 7-N-lysino-9a-methoxymitosane is obtained as amorphous powder. Yield: 470 mg.

Figure 5:
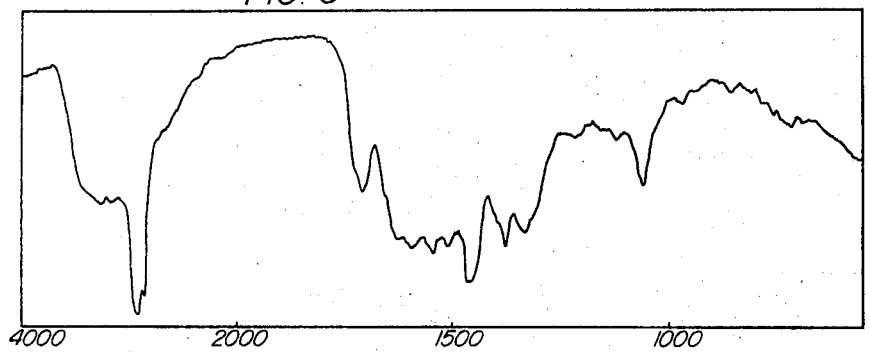

The infra-red spectrum in Nujol is shown in FIG. 5.

Example 6

7-N-arginino-9a-methoxymitosane

Using 210 mg. of L-arginine in place of 150 mg. of L-lysine in Example 5, 420 mg. of amorphous powder of 7-N-arginino-9a-methoxymitosane is produced from 350 mg. of mitomycin A.

Figure 6:
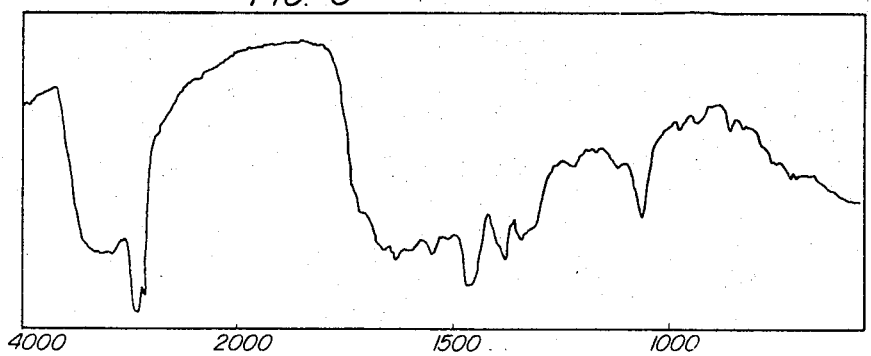

The infra-red spectrum in Nujol is shown in FIG. 6.

Example 7

1a-methyl-7-n-propylamino-9a-methoxymitosane 50 mg. of 1a-methyl mitomycin A is dissolved in 10 ml. of methanol, followed by the addition of excess of n-propylamine. After 10 minutes the bluish purple reaction mixture is concentrated under reduced pressure. Crystallization is conducted by ethyl acetate. 40 mg. of bluish purple needle crystals of 1a-methyl-7-n-propylamino-9a-methoxy-mitosane is obtained. M.P. 178° C.

*Analysis.*—Calcd. for $C_{19}H_{26}O_5N_4$: C, 58.45; H, 6.71; N, 14.35. Found: C, 58.20; H, 6.50; N, 14.10.

Figure 7:
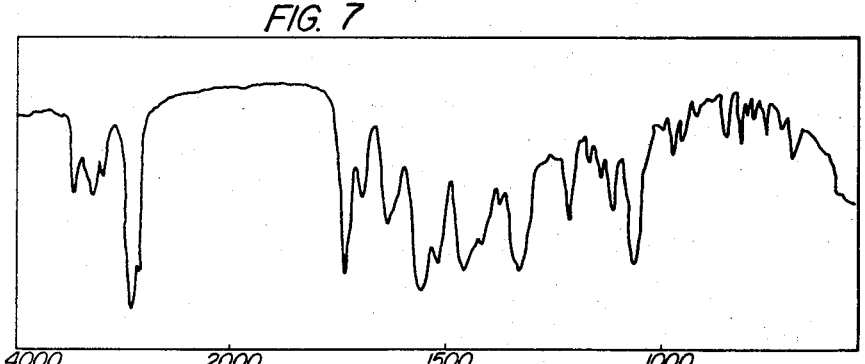

Infra-red spectrum Nujol is shown in FIG. 7.

Example 8

1a-benzoyl-7-n-propylamino-9a-methoxy-mitosane 200 mg. of 1a-benzoyl mitomycin A is dissolved in 10 ml. of methanol, followed by the addition of 1 ml. of n-propylamine. The further treatment is conducted as in Example 5. 145 mg. of bluish purple needle crystals of 1a-benzoyl-7-n-propylamino-9a-methoxy-mitosane is obtained. M.P. 120° C.

*Analysis.*—Calcd. for $C_{25}H_{28}O_6N_4$: C, 62.48; H, 5.28; N, 11.66. Found: C, 62.10; H, 5.60; N, 11.40.

Figure 8:
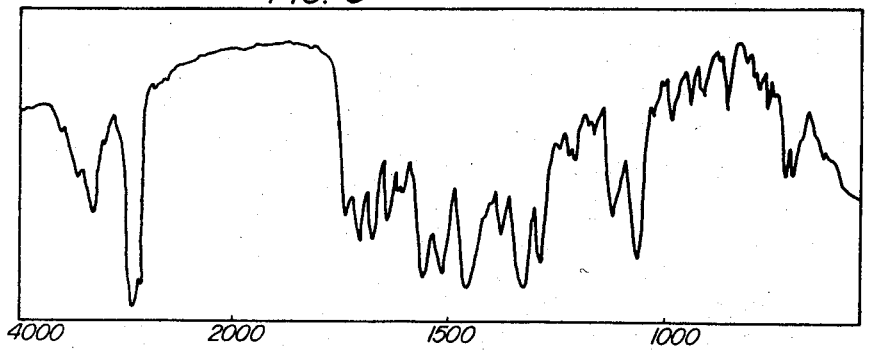

Infra-red spectrum in Nujol is shown in FIG. 8.

$LD_{50}$ (mg./kg.—mouse) of the new derivatives of the present aspect are shown in Table 1b and the minimum inhibition concentrations are shown in Table 2.

TABLE 1

| | $LD_{50}$ (mg./kg.) |
|---|---|
| 7-anilino-9a-methoxymitosane | 37.5 |
| 7-n-butylamino-9a-methoxymitosane | 18.75 |
| 7-n-amylamino-9a-methoxymitosane | 18.45 |
| 7-n-hexylamino-9a-methoxymitosane | 37.5 |
| 7-N-lysino-9a-methoxymitosane | 225.0 |
| 7-N-arginino-9a-methoxymitosane | 300 |

TABLE 2.—MINIMUM INHIBITING CONCENTRATION (mcg./ml.)

| | 7-n-butyl-amino-9a-methoxy-mitosane | 7-n-propyl-amino-9a-methoxy-mitosane | 7-n-hexyl-amino-9a-methoxy-mitosane | 7-anilino-9a-methoxy-mitosane | 7-N-lysino-9a-methoxy-mitosane | 7-n-arginino-9a-methoxy-mitosane |
|---|---|---|---|---|---|---|
| Staphylococcus aureus 209P | 0.094 | 0.195 | 0.78 | 0.39 | 6.25 | 25 |
| Sarcinalutea PcI 1001 | 0.195 | 0.39 | 1.56 | 0.048 | 6.25 | 3.12 |
| Bacillus subtilis ATCC 6633 | 0.097 | 0.195 | 0.78 | 0.048 | 6.25 | 25 |
| Salmonella typhi 379 | 12.5 | 12.5 | 750 | 3.12 | 50 | 50 |
| Shigella flexneri Za 3196 | 12.5 | 12.5 | 750 | 3.12 | 25 | 50 |
| Klebsiella pneumoniae 0/10 | 25 | 6.25 | 50 | 1.56 | 25 | 25 |
| Proteus X 19 | 50 | 12.5 | 50 | 12.5 | 50 | 50 |
| Eschericha coli K-12 | 25 | 6.25 | 50 | 12.5 | 25 | 50 |
| Pseudomonas aeruginosa 35 | 50 | 12.5 | 50 | 12.5 | 50 | 50 |
| Vibrio comma 62 | 0.39 | 0.097 | 1.56 | 0.024 | 0.39 | 3.12 |
| Mycobacterium tuberculosis 607 | 3.12 | 0.39 | 1.56 | 0.195 | 1.56 | 12.5 |
| Streptococcus hamemolyticus 68 | 0.98 | 0.78 | 3.12 | 0.024 | 3.12 | 12.5 |
| Streptococcus faecalis 5 | 0.097 | 0.195 | 0.78 | 0.048 | 6.25 | 12.5 |
| Diplococcus pneumoniae 1-19 | 0.48 | 0.048 | 0.195 | 0.024 | 0.195 | 0.39 |
| Corynebacterium diphtheriae 92 | 0.39 | 0.39 | 12.5 | 0.048 | 12.5 | 1.56 |

What is claimed is:
1. 7-N-lysino-9a-methoxymitosane.
2. 7-N-arginino-9a-methoxymitosane.

References Cited

UNITED STATES PATENTS

| | | | |
|---|---|---|---|
| 3,226,393 | 12/1965 | Meyer et al. | 260—295 |
| 3,306,821 | 2/1967 | Schroeder | 167—65 |
| 3,332,944 | 7/1967 | Cosulich et al. | 260—247.2 |

FOREIGN PATENTS 648,956  9/1964  Belgium.

OTHER REFERENCES

Theilheimer, Synthetic Methods of Organic Chemistry: vol. 4, Abstract Nos. 345–348 pp. 123–4 OD 265T4 (1950).

Webb et al.: J. Am. Chem. Soc., vol. 84, pp. 3185–3187 (1962).

NICHOLAS S. RIZZO, *Primary Examiner.*

J. A. NARCAVAGE, *Assistant Examiner.*

U.S. Cl. X.R.

424—274